(12) United States Patent
Scherberger et al.

(10) Patent No.: US 8,510,183 B2
(45) Date of Patent: Aug. 13, 2013

(54) SYSTEM AND METHOD FOR DISTRIBUTED AND INTEGRATED ASSET MANAGEMENT

(75) Inventors: Gunter Scherberger, Denzlingen (DE); Michael Hohendorf, Waghausel (DE); Monika Morey, Hattingen (DE)

(73) Assignee: SAP AG, Walldorf (DE)

( * ) Notice: Subject to any disclaimer, the term of this patent is extended or adjusted under 35 U.S.C. 154(b) by 1997 days.

(21) Appl. No.: 11/322,328

(22) Filed: Dec. 30, 2005

(65) Prior Publication Data

US 2007/0156474 A1    Jul. 5, 2007

(51) Int. Cl.
*G07B 17/00* (2006.01)
*G07F 19/00* (2006.01)
*G07F 7/10* (2006.01)

(52) U.S. Cl.
USPC ............................................. 705/30; 705/33

(58) Field of Classification Search
USPC ....................................... 705/30, 33
See application file for complete search history.

(56) References Cited

U.S. PATENT DOCUMENTS

| | | | | |
|---|---|---|---|---|
| 5,875,435 A * | 2/1999 | Brown | | 705/30 |
| 6,058,375 A * | 5/2000 | Park | | 705/30 |
| 6,128,602 A * | 10/2000 | Northington et al. | | 705/35 |
| 6,442,533 B1 * | 8/2002 | Hinkle | | 705/36 R |
| 2003/0050876 A1 * | 3/2003 | Tawara et al. | | 705/30 |
| 2005/0165664 A1 * | 7/2005 | Koretake | | 705/30 |
| 2005/0216389 A1 * | 9/2005 | Leung | | 705/35 |
| 2005/0274792 A1 * | 12/2005 | Hahn-Carlson et al. | | 235/379 |

* cited by examiner

*Primary Examiner* — Ig T An
(74) *Attorney, Agent, or Firm* — Schwegman, Lundberg & Woessner, P.A.

(57) ABSTRACT

In an embodiment, a plurality of logical deployment units are distributed throughout a system. Each logical deployment unit is provided with one or more business objects. Links are set up between the plurality of logical deployment units, and the logical deployment units are enabled to receive a business transaction and to identify an individual material associated with the business transaction. In the embodiment, each business object is visible only within its own logical deployment unit and has access to the individual material, and the plurality of logical deployment units and the one or more business objects are integrated.

20 Claims, 3 Drawing Sheets

SYSTEM AND METHOD FOR DISTRIBUTED AND INTEGRATED ASSET MANAGEMENT

BACKGROUND

The asset accounting systems of most business organizations today are centralized. Because of this centralization, all groups or divisions within a business organization have access to these accounting records. For example, when an asset such as a personal computer is accounted for in an asset management system, all the different groups or divisions of the business organization, such as purchasing, receiving, shipping, production, and accounting, have access to that centralized asset information. Furthermore, as a result of this centralization, when a good or material comes into the system and is accounted for according to the relevant accounting practices, the group of the business organization that is responsible for acquiring that good or service, for example the purchasing department, must account for that good or service according to the accepted rules of accounting. This may cause problems however since the purchasing department generally does not have the expertise on the pertinent accounting rules, and may not properly designate for accounting purposes many of the goods and materials coming into the business. This predicament is not easily solvable by requiring the accounting department to account for the good or material as it enters the business organization because it is not the accounting department that first receives this good or material. Additionally, with the advent of globalization and multinational companies, the functions of a business organization may be distributed throughout the world and many different countries, and the accounting functions of a business organization may be far removed from the operations of the organization. Such globalization and deployment has put a strain on the typical centralalized asset management system.

SUMMARY

In an embodiment, a plurality of logical deployment units are distributed throughout a system. Each logical deployment unit is provided with one or more business objects. Links are set up between the plurality of logical deployment units, and the logical deployment units are enabled to receive a business transaction and to identify an individual material associated with the business transaction. In the embodiment, each business object is visible only within its own logical deployment unit and has access to the individual material, and the plurality of logical deployment units and the one or more business objects are integrated.

DETAILED DESCRIPTION

Figure 1:
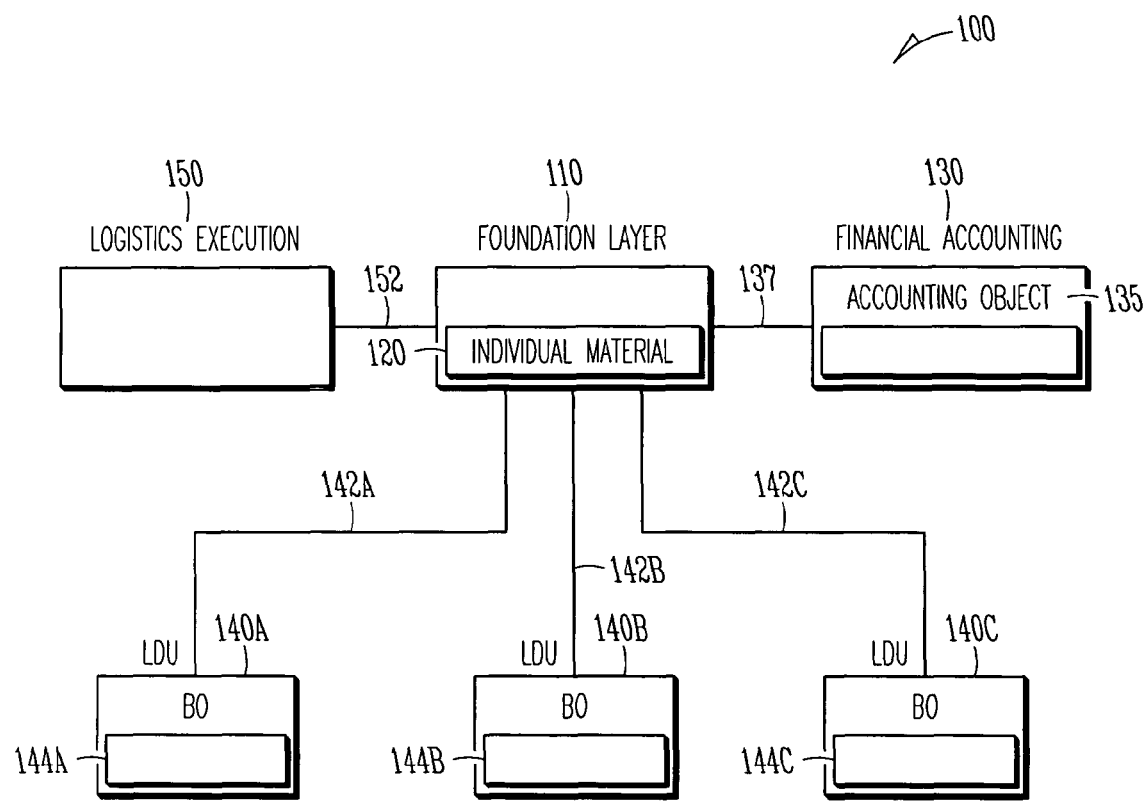
FIG. 1 is an example embodiment of an architecture including logical deployment units.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

In many business organizations today, the organization is primarily divided into an operations side and an accounting side. Additionally, the operations side of the business may be subdivided into may different units. One result of this demarcation and distribution is that a good or material is viewed somewhat differently by operations and accounting. For example, operations may view the good or material as a real object to be used for a particular purpose, and accounting may view the good or material as a financial asset to one degree or another. More specifically, while operations may view an object as simply a piece of equipment, this same object from an accounting point of view may be viewed as a fixed asset, a material, or a cost. Moreover, the operations side of the business organization in many cases is deployed into Logical Deployment Units (LDUs). A LDU is one or more modules of software that can be operated on a separate system isolated from other software. In an embodiment, such LDUs are created and implemented in order to distribute the different functions of a business organization over different machines or nodes. These LDUs relate to the different functions within the business organization, and relate to such things as receiving, purchasing, shipping, and production. While the operations and accounting sides are somewhat separate, and the operations side may further be divided into separate LDUs, each LDU and object of accounting may need to know about, access, and manipulate the same objects or materials. Moreover, the distribution may be geographical in nature, as certain LDUs are deployed in some countries while others are deployed in other countries. The LDUs may be divided up into process components, and the process components may be divided up into business objects, with each business object including a database. In an embodiment of such a distributed system, the business object of one process component of one LDU cannot access the database of a business object of another process component of another LDU.

Because of this distributed structure, operation departments such as purchasing do not have to know about the capitalization of the asset (i.e., placing the material or good into the proper ledger in the accounting system). Rather, a particular business object such as purchasing need only supply some basic descriptive information about the good or material to an object of accounting. The object of accounting then capitalizes the asset into its accounting system. Consequently, while in prior systems the department or division represented by the business object had to determine the type of asset that the good or material was, in various embodiments of the invention that asset is now simply an individual material that is used by the system in its business processes.

FIG. 1 illustrates an example embodiment of a distributed and integrated asset management system 100. The system 100 includes a foundation layer 110. An individual material 120 is maintained in the foundation layer 110, and more particularly, the individual material 120 is maintained in the foundation layer 110. The individual material 120 is simply a reference to a physical object within a business organization, whether it is a mobile phone or a piece of heavy equipment. Furthermore, the individual material serves as a central object, and it is visible and accessible by all parts of the system 100. The system 100 further includes a financial accounting module 130 that includes an object of accounting 135. In an embodiment, the object of accounting 135 is referred to as a fixed asset object, which is visible only within the financial accounting module 130, and which takes care of capitalizing fixed assets. The financial accounting module 130 is coupled to the foundation layer 110 via link 137. Also coupled to the foundation layer 110 via links 142A, 142B, and 142C are one or more LDUs 140A, 140B, and 140C. Each LDU includes one or more business objects. In the embodiment of FIG. 1, each LDU contains one business object 144A, 144B, and 144C respectively. In an embodiment, the business objects 144A, 144B, and 144C relate to non-accounting operation functions. A logistics execution object 150 is in communication with the foundation layer 110 via link 152, and it serves as a controller by handling the logistics of the system 100. Each business object 144A, 144B, and 144C has access to the individual material 120 in the foundation layer 110.

Figure 2:
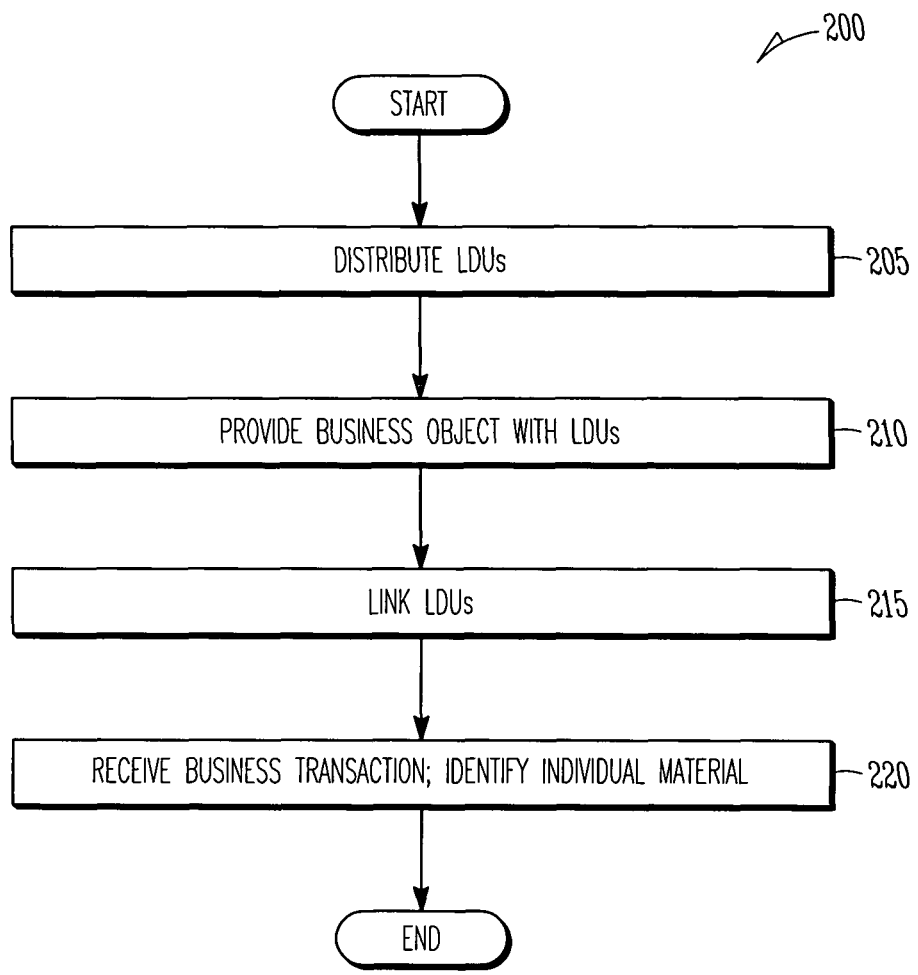
FIG. 2 is an example embodiment of a process to implement a distributed and integrated architecture.
Figure 3:
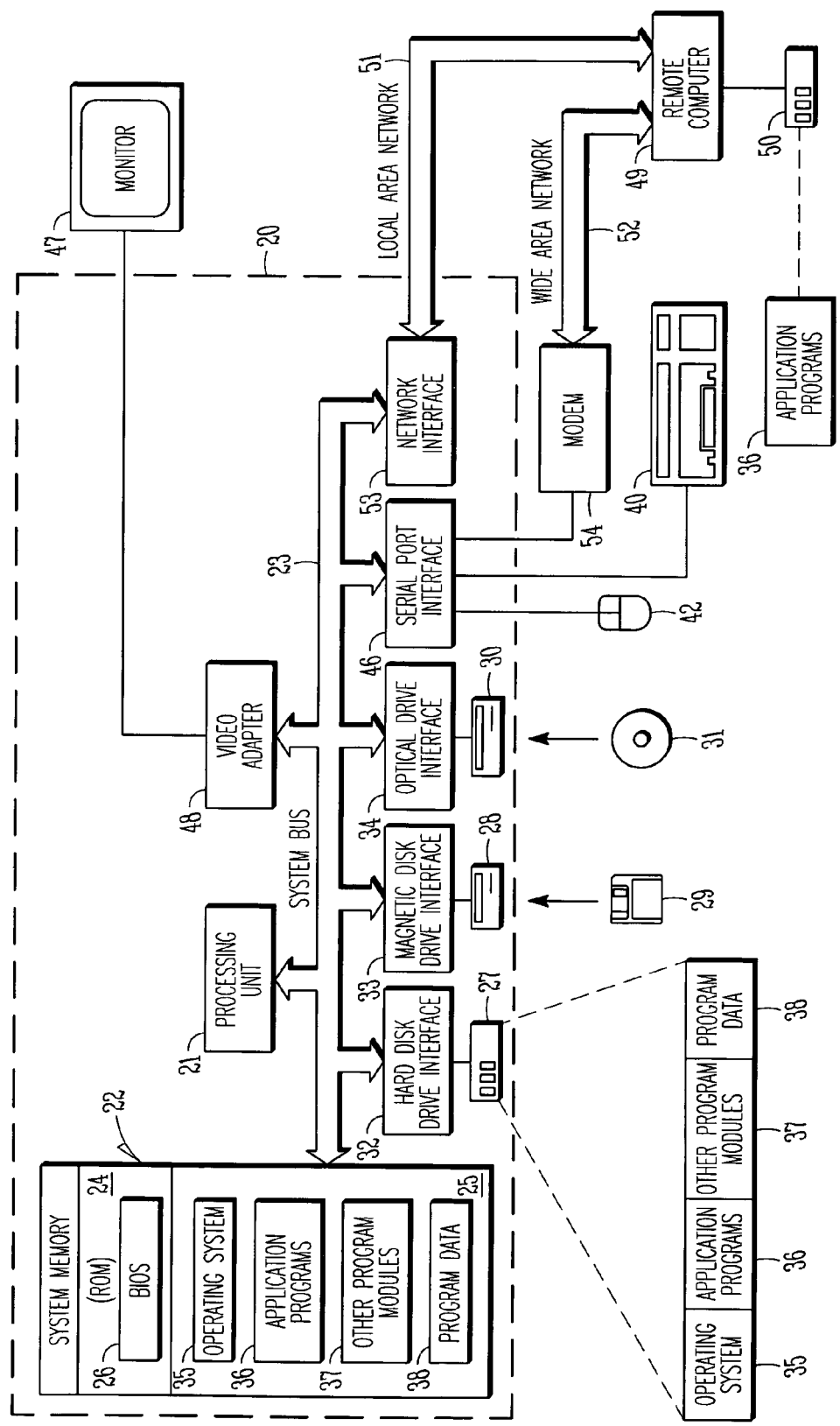
FIG. 3 is an example embodiment of a computer system upon which embodiments of the present invention may execute.

FIG. 2 illustrates an embodiment of a process 200 to implement a distributed and integrated management system such as the system 100 of FIG. 1. Specifically, FIG. 2 illustrates in operation 205 a step of distributing one or more LDUs, and further at operation 210 providing one or more business objects within each deployed LDU. Operation 215 provides links between the plurality of logical deployment units, and operation 220 enables one or more of the LDUs to receive a business transaction and to identify an individual material associated with the business transaction. As illustrated in FIG. 1, the system 100 is integrated via the links 137, 142A, 142B, 142C, and 152. Furthermore, in an embodiment, each business object within an LDU is visible only within the LDU in which it resides. However, each business object has access to the individual material object 120 in the foundation layer 110.

After a distributed and integrated system such as the one in FIG. 1 has been deployed as illustrated in FIG. 2, in an embodiment, a material or good enters the system 100 through a logical deployment unit such as 140A, 140B, or 140C. The logical deployment unit passes information about the good to the foundation layer 110, and the individual material object 120 is created in the foundation layer 110. That individual material object 120 in the foundation layer 110 is accessible by every business object in each LDU. The individual material 120 as an object further is available to the object of accounting 135. Specifically, the foundation layer 110 then passes information about the good or material to the object of accounting 135 which capitalizes the asset into the accounting ledger.

As an example, if a particular system has at least a purchasing logical deployment unit and a receiving logical deployment unit, an individual material object 120 is created for a good such as a personal computer when purchasing creates a purchase order for the computer. This individual material object 120 is kept in the foundation layer 110, and other logical deployment units have access to that individual material object 120. Then, when the receiving department receives the computer, the receiving logical deployment unit has access to the individual material object for the computer in the foundation layer.

In the embodiment of FIG. 1, non-accounting functions in the system 100 are provided by the business objects 144A, 144B, and 144C. And as previously disclosed, while capitalization is handled by the accounting module 130, the preparation for capitalization is handled in all the other non-accounting business objects. Consequently, non-accounting business objects do not have to know if an object is a fixed asset in accounting, since outside of the object of accounting, an asset is always represented as an individual material. Therefore, an individual material links the various business objects together. So it is the individual material, not the asset, that is in the coding blocks of the non-accounting business objects.

FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A process comprising:
using a computer processor for distributing a plurality of logical deployment units;
using the computer processor for providing at least one business object within each logical deployment unit;
using the computer processor for providing links between the plurality of logical deployment units; and
using the computer processor for enabling at least one of the logical deployment units to receive a business transaction and to identify an individual material associated with the business transaction;
wherein each business object is visible only within its own logical deployment unit and has access to the individual material;
wherein the plurality of logical deployment units and the at least one business object are integrated; and
wherein the individual material associated with the business transaction is a reference to a physical object in a business organization; and further
wherein the individual material contains no indication regarding a type of asset associated with the physical object.

2. The process of claim 1, further comprising:
providing a foundation layer; and
enabling the transmission of the individual material to the foundation layer;
wherein the logical deployment units are linked to each other via the foundation layer; and
the plurality of logical deployment units have access to the individual material through the foundation layer.

3. The process of claim 1, wherein
a first business object of the at least one business object comprises an object of accounting; and
at least one other business object comprises an operation object.

4. The process of claim 3, wherein each of the at least one other business object comprises a different view of the individual material.

5. The process of claim 4, wherein the different view comprises at least one of a fixed asset, a material, a cost, or a piece of equipment.

6. The process of claim 3, further comprising:
enabling the transmission of a message from the logical deployment unit that receives a business transaction to the object of accounting; and
enabling the capitalization of the individual material into a ledger within the object of accounting.

7. The process of claim 6, further comprising enabling the object of accounting to classify the individual material as a fixed asset.

8. A system comprising:
a computer processor configured to distribute a plurality of logical deployment units;
a computer processor configured to provide at least one business object within each logical deployment unit;
a computer processor configured to provide links between the plurality of logical deployment units; and
a computer processor configured to enable at least one of the logical deployment units to receive a business transaction and to identify an individual material associated with the business transaction;
wherein each business object is visible only within its own logical deployment unit and has access to the individual material;
wherein the plurality of logical deployment units and the at least one business object are integrated; and
wherein the individual material associated with the business transaction is a reference to a physical object in a business organization; and further
wherein the individual material contains no indication regarding a type of asset associated with the physical object.

9. The system of claim 8, further comprising:
a module to provide a foundation layer; and
a module to enable the transmission of the individual material to the foundation layer;
wherein the logical deployment units are linked to each other via the foundation layer; and
the plurality of logical deployment units have access to the individual material through the foundation layer.

10. The system of claim 8, wherein
a first business object of the at least one business object comprises an object of accounting; and
at least one other business object comprises an operation object.

11. The system of claim 10, wherein each of the at least one other business object comprises a different view of the individual material.

12. The system of claim 11, wherein the different view comprises at least one of a fixed asset, a material, a cost, or a piece of equipment.

13. The system of claim 10, further comprising:
a module to enable the transmission of a message from the logical deployment unit that receives a business transaction to the object of accounting; and
a module to enable the capitalization of the individual material into a ledger within the object of accounting.

14. The system of claim 13, further comprising a module to enable the object of accounting to classify the individual material as a fixed asset.

15. A machine-readable medium comprising instructions thereon for executing a process comprising:
distributing a plurality of logical deployment units;
providing at least one business object within each logical deployment unit;
providing links between the plurality of logical deployment units; and
enabling at least one of the logical deployment units to receive a business transaction and to identify an individual material associated with the business transaction;
wherein each business object is visible only within its own logical deployment unit and has access to the individual material;
wherein the plurality of logical deployment units and the at least one business object are integrated; and
wherein the individual material associated with the business transaction is a reference to a physical object in a business organization; and further
wherein the individual material contains no indication regarding a type of asset associated with the physical object.

16. The machine-readable medium of claim 15, further comprising instructions for:
providing a foundation layer; and
enabling the transmission of the individual material to the foundation layer;
wherein the logical deployment units are linked to each other via the foundation layer; and
the plurality of logical deployment units have access to the individual material through the foundation layer.

17. The machine-readable medium of claim 15, wherein
a first business object of the at least one business object comprises an object of accounting; and
at least one other business object comprises an operation object.

18. The machine-readable medium of claim 17, wherein each of the at least one other business object comprises a different view of the individual material.

19. The machine-readable medium of claim 18, wherein the different view comprises at least one of a fixed asset, a material, a cost, or a piece of equipment.

20. The machine-readable medium of claim 17, further comprising instructions thereon for:
enabling the transmission of a message from the logical deployment unit that receives a business transaction to the object of accounting;
enabling the capitalization of the individual material into a ledger within the object of accounting; and
enabling the object of accounting to classify the individual material as a fixed asset.

* * * * *